US012561607B2

(12) United States Patent
Sundar et al.

(10) Patent No.: US 12,561,607 B2
(45) Date of Patent: Feb. 24, 2026

(54) INTELLIGENT DATA INGESTION

(71) Applicant: ADP, Inc., Roseland, NJ (US)

(72) Inventors: Aravind Sundar, Bristol (GB); Naveen Baskaran, Chennai (IN); Rajkumar Selvaraj, Chennai (IN); Janarthanan Venu, Chennai (IN); Kavitha Pradeepkumar, Chennai (IN)

(73) Assignee: ADP, Inc., Roseland, NJ (US)

( * ) Notice: Subject to any disclaimer, the term of this patent is extended or adjusted under 35 U.S.C. 154(b) by 915 days.

(21) Appl. No.: 17/805,041

(22) Filed: Jun. 2, 2022

(65) Prior Publication Data

US 2023/0394351 A1 Dec. 7, 2023

(51) Int. Cl.
G06N 20/00 (2019.01)
G06F 16/22 (2019.01)

(52) U.S. Cl.
CPC ........... G06N 20/00 (2019.01); G06F 16/221 (2019.01)

(58) Field of Classification Search
None
See application file for complete search history.

(56) References Cited

U.S. PATENT DOCUMENTS

2009/0106242 A1 4/2009 McGrew et al.
2011/0004622 A1 1/2011 Marson
2013/0297661 A1* 11/2013 Jagota ..................... G06F 16/11
707/822
2017/0300862 A1 10/2017 Bhadouria et al.
2020/0134083 A1 4/2020 Elliman
2020/0250562 A1 8/2020 Bly
2022/0269663 A1* 8/2022 Raphael .............. G06F 16/2282
2024/0419706 A1* 12/2024 Gutierrez ............. G06F 40/166
2025/0045304 A1* 2/2025 Quatro ................... G06N 20/00

OTHER PUBLICATIONS

Hulsebos et al. "Sherlock: A Deep Learning Approach to Semantic Data Type Detection," MIT Media Lab, retrieved from the internet on Mav 13, 2025 (9 pages).*
Hulsebos et al. "Sherlock: A Deep Learning Approach to Semantic Data Type Detection", MIT Media Lab, retrieved from the internet: <https://arxiv.org/abs/1905.10688> on May 25, 2019 (9 pages).
International Search Report and Written Opinion issued in corresponding International Application No. PCT/US2023/024226, dated Aug. 30, 2023 (16 pages).

* cited by examiner

*Primary Examiner* — Jamie R Kucab
(74) *Attorney, Agent, or Firm* — Foley & Lardner LLP

(57) ABSTRACT

Intelligent data ingestion is provided. A determined column header name of a selected column in an imported data file is mapped to a predicted corresponding column header name of a particular column in a database corresponding to a human capital management application using a plurality of machine learning models. It is determined whether the predicted corresponding column header name output by each respective machine learning model of the plurality of machine learning models matches. In response to determining that the predicted corresponding column header name output by each respective machine learning model of the plurality of machine learning models does match, the predicted corresponding column header name of the particular column in the database is utilized as a target column name for the determined column header name of the selected column in the imported data file.

27 Claims, 5 Drawing Sheets

FIG. 2

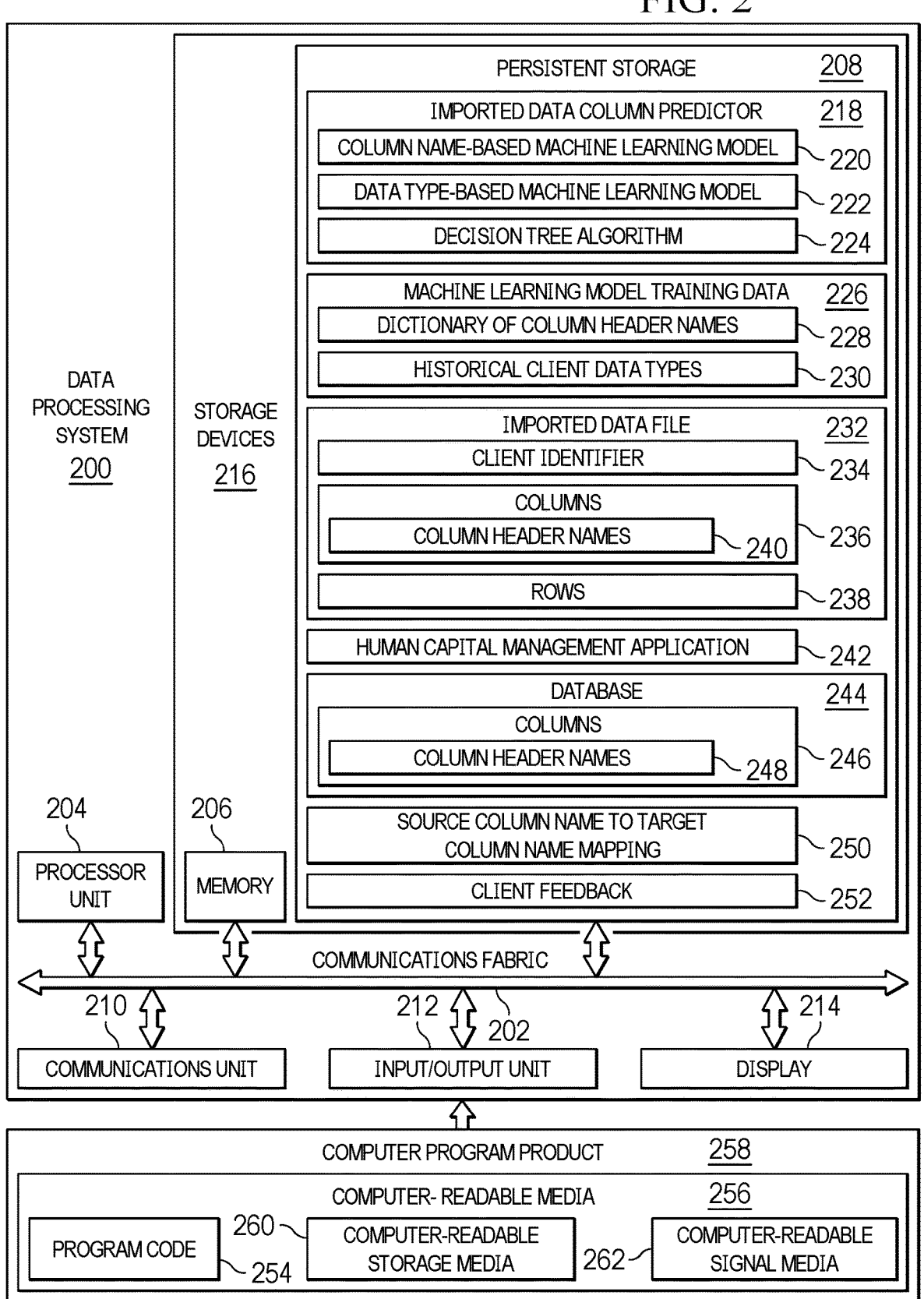

PERSISTENT STORAGE    208

IMPORTED DATA COLUMN PREDICTOR    218
COLUMN NAME-BASED MACHINE LEARNING MODEL    220
DATA TYPE-BASED MACHINE LEARNING MODEL    222
DECISION TREE ALGORITHM    224

MACHINE LEARNING MODEL TRAINING DATA    226
DICTIONARY OF COLUMN HEADER NAMES    228
HISTORICAL CLIENT DATA TYPES    230

IMPORTED DATA FILE    232
CLIENT IDENTIFIER    234
COLUMNS
COLUMN HEADER NAMES    240    236
ROWS    238

HUMAN CAPITAL MANAGEMENT APPLICATION    242

DATABASE    244
COLUMNS
COLUMN HEADER NAMES    248    246

SOURCE COLUMN NAME TO TARGET COLUMN NAME MAPPING    250

CLIENT FEEDBACK    252

DATA PROCESSING SYSTEM    200

STORAGE DEVICES    216

204
PROCESSOR UNIT

206
MEMORY

COMMUNICATIONS FABRIC

202

210
COMMUNICATIONS UNIT

212
INPUT/OUTPUT UNIT

214
DISPLAY

COMPUTER PROGRAM PRODUCT    258
COMPUTER- READABLE MEDIA    256

PROGRAM CODE 260
254

COMPUTER-READABLE STORAGE MEDIA

262

COMPUTER-READABLE SIGNAL MEDIA

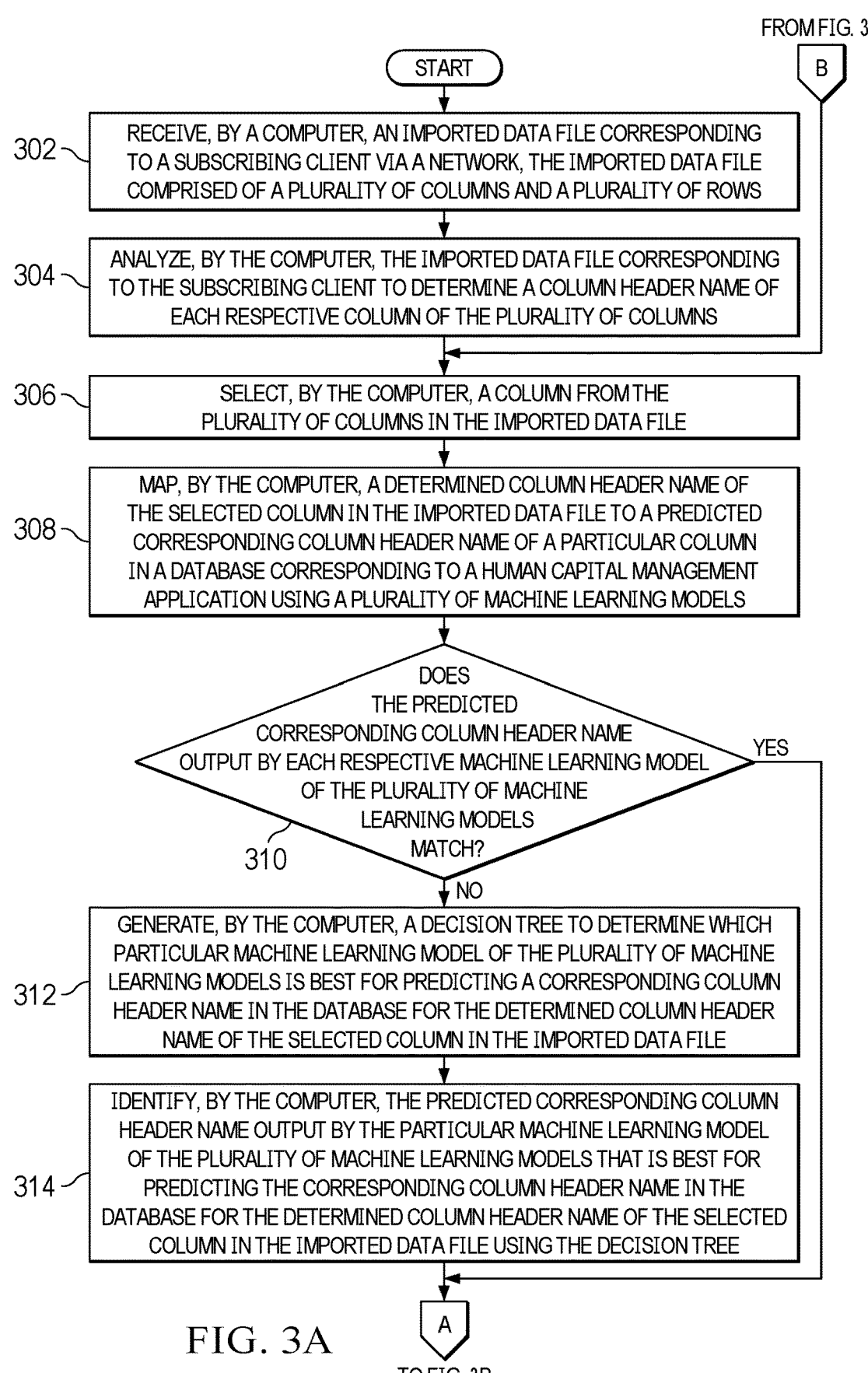

FROM FIG. 3B

START

302 RECEIVE, BY A COMPUTER, AN IMPORTED DATA FILE CORRESPONDING TO A SUBSCRIBING CLIENT VIA A NETWORK, THE IMPORTED DATA FILE COMPRISED OF A PLURALITY OF COLUMNS AND A PLURALITY OF ROWS

304 ANALYZE, BY THE COMPUTER, THE IMPORTED DATA FILE CORRESPONDING TO THE SUBSCRIBING CLIENT TO DETERMINE A COLUMN HEADER NAME OF EACH RESPECTIVE COLUMN OF THE PLURALITY OF COLUMNS

306 SELECT, BY THE COMPUTER, A COLUMN FROM THE PLURALITY OF COLUMNS IN THE IMPORTED DATA FILE

308 MAP, BY THE COMPUTER, A DETERMINED COLUMN HEADER NAME OF THE SELECTED COLUMN IN THE IMPORTED DATA FILE TO A PREDICTED CORRESPONDING COLUMN HEADER NAME OF A PARTICULAR COLUMN IN A DATABASE CORRESPONDING TO A HUMAN CAPITAL MANAGEMENT APPLICATION USING A PLURALITY OF MACHINE LEARNING MODELS

310 DOES THE PREDICTED CORRESPONDING COLUMN HEADER NAME OUTPUT BY EACH RESPECTIVE MACHINE LEARNING MODEL OF THE PLURALITY OF MACHINE LEARNING MODELS MATCH?

YES

NO

312 GENERATE, BY THE COMPUTER, A DECISION TREE TO DETERMINE WHICH PARTICULAR MACHINE LEARNING MODEL OF THE PLURALITY OF MACHINE LEARNING MODELS IS BEST FOR PREDICTING A CORRESPONDING COLUMN HEADER NAME IN THE DATABASE FOR THE DETERMINED COLUMN HEADER NAME OF THE SELECTED COLUMN IN THE IMPORTED DATA FILE

314 IDENTIFY, BY THE COMPUTER, THE PREDICTED CORRESPONDING COLUMN HEADER NAME OUTPUT BY THE PARTICULAR MACHINE LEARNING MODEL OF THE PLURALITY OF MACHINE LEARNING MODELS THAT IS BEST FOR PREDICTING THE CORRESPONDING COLUMN HEADER NAME IN THE DATABASE FOR THE DETERMINED COLUMN HEADER NAME OF THE SELECTED COLUMN IN THE IMPORTED DATA FILE USING THE DECISION TREE

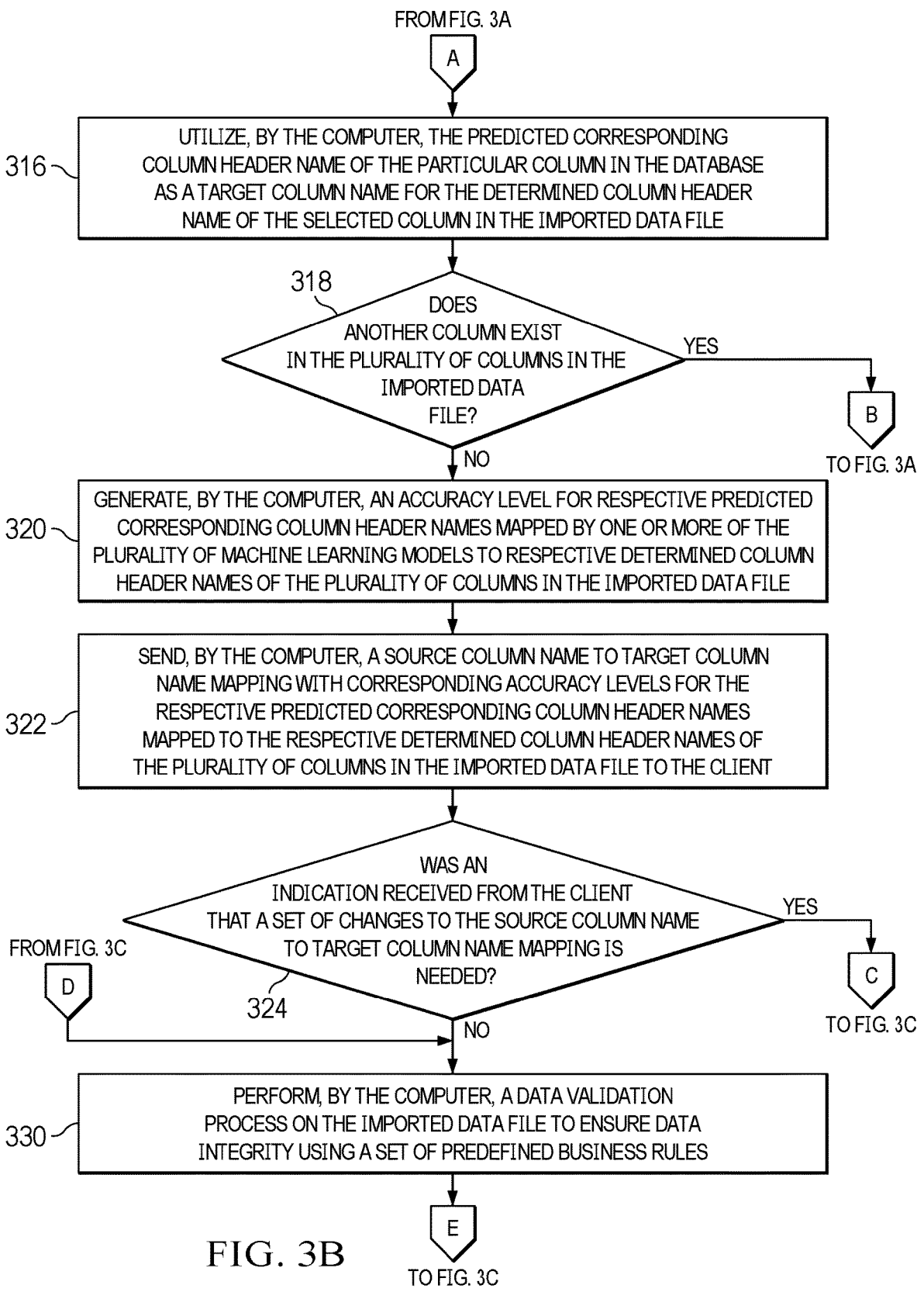

FROM FIG. 3A

A

316 — UTILIZE, BY THE COMPUTER, THE PREDICTED CORRESPONDING COLUMN HEADER NAME OF THE PARTICULAR COLUMN IN THE DATABASE AS A TARGET COLUMN NAME FOR THE DETERMINED COLUMN HEADER NAME OF THE SELECTED COLUMN IN THE IMPORTED DATA FILE

318 — DOES ANOTHER COLUMN EXIST IN THE PLURALITY OF COLUMNS IN THE IMPORTED DATA FILE?

YES

320 — GENERATE, BY THE COMPUTER, AN ACCURACY LEVEL FOR RESPECTIVE PREDICTED CORRESPONDING COLUMN HEADER NAMES MAPPED BY ONE OR MORE OF THE PLURALITY OF MACHINE LEARNING MODELS TO RESPECTIVE DETERMINED COLUMN HEADER NAMES OF THE PLURALITY OF COLUMNS IN THE IMPORTED DATA FILE

322 — SEND, BY THE COMPUTER, A SOURCE COLUMN NAME TO TARGET COLUMN NAME MAPPING WITH CORRESPONDING ACCURACY LEVELS FOR THE RESPECTIVE PREDICTED CORRESPONDING COLUMN HEADER NAMES MAPPED TO THE RESPECTIVE DETERMINED COLUMN HEADER NAMES OF THE PLURALITY OF COLUMNS IN THE IMPORTED DATA FILE TO THE CLIENT

WAS AN INDICATION RECEIVED FROM THE CLIENT THAT A SET OF CHANGES TO THE SOURCE COLUMN NAME TO TARGET COLUMN NAME MAPPING IS NEEDED?

YES

FROM FIG. 3C

D

324

NO

330 — PERFORM, BY THE COMPUTER, A DATA VALIDATION PROCESS ON THE IMPORTED DATA FILE TO ENSURE DATA INTEGRITY USING A SET OF PREDEFINED BUSINESS RULES

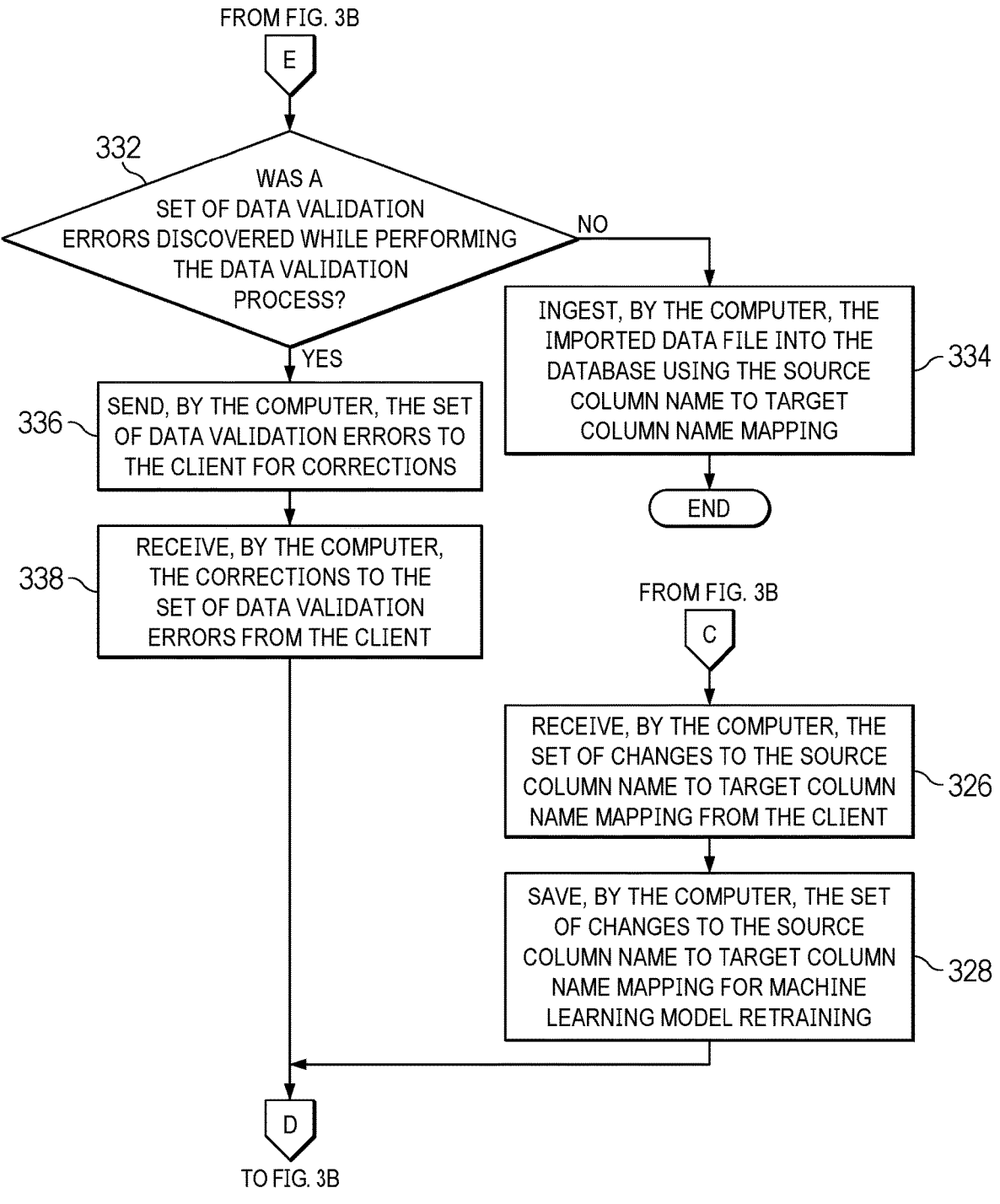

FROM FIG. 3B

E

332 — WAS A SET OF DATA VALIDATION ERRORS DISCOVERED WHILE PERFORMING THE DATA VALIDATION PROCESS?

NO

INGEST, BY THE COMPUTER, THE IMPORTED DATA FILE INTO THE DATABASE USING THE SOURCE COLUMN NAME TO TARGET COLUMN NAME MAPPING — 334

YES

336 — SEND, BY THE COMPUTER, THE SET OF DATA VALIDATION ERRORS TO THE CLIENT FOR CORRECTIONS

END

338 — RECEIVE, BY THE COMPUTER, THE CORRECTIONS TO THE SET OF DATA VALIDATION ERRORS FROM THE CLIENT

FROM FIG. 3B

C

RECEIVE, BY THE COMPUTER, THE SET OF CHANGES TO THE SOURCE COLUMN NAME TO TARGET COLUMN NAME MAPPING FROM THE CLIENT — 326

SAVE, BY THE COMPUTER, THE SET OF CHANGES TO THE SOURCE COLUMN NAME TO TARGET COLUMN NAME MAPPING FOR MACHINE LEARNING MODEL RETRAINING — 328

INTELLIGENT DATA INGESTION

BACKGROUND

1. Field

The disclosure relates generally to human capital management data and more specifically to intelligently ingesting client data into a database corresponding to a human capital management service provider using a plurality of machine learning models.

2. Description of the Related Art

Human capital management is the process of hiring appropriate people, managing workforces, and optimizing productivity. Human capital management has evolved from a mostly administrative function to an enabler of business value. Human capital management is made up of a series of administrative and strategic applications that include, for example, recruitment, onboarding, payroll, time and attendance, benefits and retirement services, talent management, training, reports, analytics, compliance, and the like. Human capital management can improve workforce productivity and help human resource managers hire, engage, and retain employees.

Most businesses are concerned with overcoming today's obstacles and anticipating tomorrow's needs. Human capital management can assist businesses in addressing these issues. For example, human capital management can identify opportunities throughout the employee lifecycle to engage employees and align employee performance with business goals.

SUMMARY

According to one illustrative embodiment, a computer-implemented method for intelligent data ingestion is provided. The computer maps a determined column header name of a selected column in an imported data file to a predicted corresponding column header name of a particular column in a database corresponding to a human capital management application using a plurality of machine learning models. The computer determines whether the predicted corresponding column header name output by each respective machine learning model of the plurality of machine learning models matches. In response to the computer determining that the predicted corresponding column header name output by each respective machine learning model of the plurality of machine learning models does match, the computer utilizes the predicted corresponding column header name of the particular column in the database as a target column name for the determined column header name of the selected column in the imported data file.

According to another illustrative embodiment, a computer system for intelligent data ingestion. is provided. The computer system comprises a bus system, a storage device storing program instructions connected to the bus system, and a processor executing the program instructions connected to the bus system. The computer system maps a determined column header name of a selected column in an imported data file to a predicted corresponding column header name of a particular column in a database corresponding to a human capital management application using a plurality of machine learning models. The computer system determines whether the predicted corresponding column header name output by each respective machine learning model of the plurality of machine learning models matches. In response to the computer system determining that the predicted corresponding column header name output by each respective machine learning model of the plurality of machine learning models does match, the computer system utilizes the predicted corresponding column header name of the particular column in the database as a target column name for the determined column header name of the selected column in the imported data file.

According to another illustrative embodiment, a computer program product for intelligent data ingestion is provided. The computer program product comprises a computer readable storage medium having program instructions embodied therewith, the program instructions executable by a computer to cause the computer to perform a method. The computer maps a determined column header name of a selected column in an imported data file to a predicted corresponding column header name of a particular column in a database corresponding to a human capital management application using a plurality of machine learning models. The computer determines whether the predicted corresponding column header name output by each respective machine learning model of the plurality of machine learning models matches. In response to the computer determining that the predicted corresponding column header name output by each respective machine learning model of the plurality of machine learning models does match, the computer utilizes the predicted corresponding column header name of the particular column in the database as a target column name for the determined column header name of the selected column in the imported data file.

According to another illustrative embodiment, a method for intelligent data ingestion is provided. Determined column header names of a plurality of columns in an imported data file are mapped to predicted corresponding column header names of columns in a database using a plurality of machine learning models. It is determined whether the predicted corresponding column header names output by each machine learning model of the plurality of machine learning models match. In response to determining that the predicted corresponding column header names output by each machine learning model of the plurality of machine learning models do match, the predicted corresponding column header names of the columns in the database are utilized as target column names for the determined column header names of the plurality of columns in the imported data file.

BRIEF DESCRIPTION OF THE DRAWINGS

FIG. 2 is a diagram of a data processing system in which illustrative embodiments may be implemented; and FIGS. 3A-3C are a flowchart illustrating a process for intelligently ingesting client data in accordance with an illustrative embodiment.

DETAILED DESCRIPTION

Figure 1:
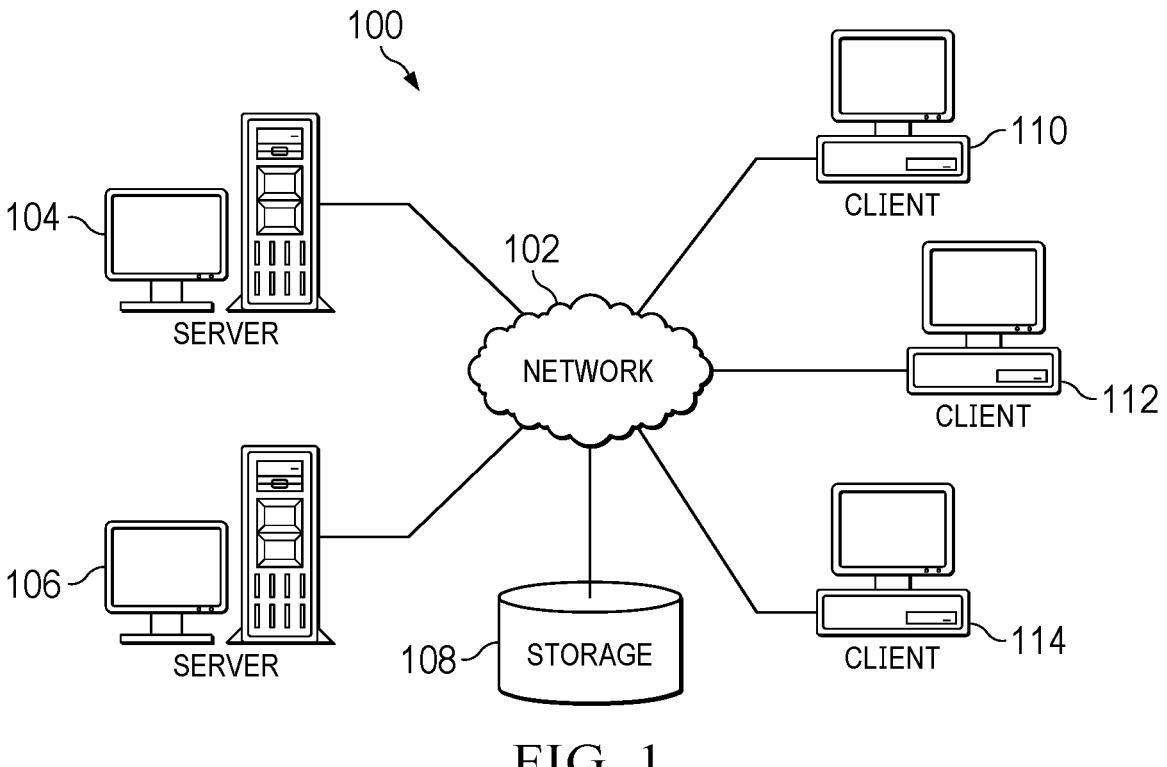
FIG. 1 is a pictorial representation of a network of data processing systems in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent a cluster of servers in one or more data centers. Alternatively, server 104 and server 106 may each represent multiple computing nodes in one or more cloud environments.

In addition, server 104 and server 106 host a set of human capital management services provided by a human capital management service provider, such as, for example, Automatic Data Processing, Inc. of Roseland, New Jersey, to subscribing clients. Furthermore, server 104 and server 106 intelligently ingest data files imported by subscribing client device users into a database corresponding to the set of human capital management services using a plurality of trained machine learning models.

Machine learning is a concept of artificial intelligence. A machine learning model can learn without being explicitly programmed to do so. A machine learning model can learn based on training data input into the machine learning model. The machine learning model can learn using various types of machine learning algorithms. The machine learning algorithms can include at least one of a supervised learning, semi-supervised learning, unsupervised learning, feature learning, sparse dictionary learning, anomaly detection, association rules, or other types of learning algorithms. Examples of machine learning models include an artificial neural network, a decision tree, a support vector machine, a Bayesian network, and other types of models. These machine learning models can be trained using stored historical client data.

Client 110, client 112, and client 114 also connect to network 102. Clients 110, 112, and 114 are registered client devices of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart televisions, and the like, with wire or wireless communication links to network 102. Subscribing users of clients 110, 112, and 114 may utilize clients 110, 112, and 114 to access and utilize the human capital management services hosted by server 104 and server 106. Further, server 104 and server 106 may provide other information, such as, for example, applications, programs, files, data, and the like to clients 110, 112, and 114.

Storage 108 is a network storage device capable of storing any type of client data in a structured or relational format comprised of columns and rows. In addition, storage 108 may represent a plurality of network storage devices. Further, storage 108 may store identifiers and network addresses for a plurality of client devices, identifiers for a plurality of client device users, and the like. Furthermore, storage 108 may store other types of data, such as authentication or credential data that may include usernames, passwords, and the like associated with, for example, client device users, system administrators, security analysts, and the like. Moreover, subscribing users of clients 110, 112, and 114 may utilize clients 110, 112, and 114 to import their corresponding data files into server 104 and server 106 for intelligent ingestion and human capital management.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a wide area network, a metropolitan area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer readable program code or instructions implementing the intelligent data ingestion processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer readable storage device or computer readable storage medium is any piece of hardware that is capable of storing information, such as, for example, without limitation, data, computer readable program instructions in functional form, and/or other suitable information either on a transient basis or a persistent basis. Further, a computer readable storage device or computer readable storage medium excludes a propagation medium, such as a transitory signal. Memory 206, in these examples, may be, for example, a random-access memory, or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores imported data column predictor 218. However, it should be noted that even though imported data column predictor 218 is illustrated as residing in persistent storage 208, in an alternative illustrative embodiment imported data column predictor 218 may be a separate component of data processing system 200. For example, imported data column predictor 218 may be a hardware component coupled to communication fabric 202 or a combination of hardware and software components. In another alternative illustrative embodiment, a first set of components of imported data column predictor 218 may be located in data processing system 200 and a second set of components of imported data column predictor 218 may be located in a second data processing system, such as, for example, server 106 in FIG. 1.

Imported data column predictor 218 controls the process of intelligently ingesting client data imported from any data source. In this example, imported data column predictor 218 includes column name-based machine learning model 220, data type-based machine learning model 222, and decision tree algorithm 224. Optionally, imported data column predictor 218 may include a column proximity-based machine learning model.

Imported data column predictor 218 utilizes column name-based machine learning model 220 to predict a corresponding column header name in a database corresponding to a human capital management application that matches a particular column header name of a given column in a client's imported data file. Imported data column predictor 218 utilizes data type-based machine learning model 222 to predict a corresponding data column header name for imported column data that has a pattern associated with it, such as, for example, an email address, mailing address, zip code, phone number, or the like. Imported data column predictor 218 utilizes decision tree algorithm 224, which is another machine learning model, to generate a decision tree for determining which particular machine learning model is more accurate at predicting an appropriate data column header name that corresponds to a column header name of a particular column in the imported data when an output of the machine learning models differ (i.e., the predicted corresponding column header names output by the machine learning models do not match). Imported data column predictor 218 may utilize the column proximity-based machine learning model to predict an appropriate data column header name when, for example, a particular column in the imported data file does not contain a header name by analyzing the column header names and corresponding row values adjacent to that particular column.

Machine learning model training data 226 represent datasets that imported data column predictor 218 utilizes to train column name-based machine learning model 220 and data type-based machine learning model 222. In this example, machine learning model training data 226 include dictionary of column header names 228 and historical client data types 230. Dictionary of column header names 228 includes a list of column header names captured from a plurality of previously imported clients' data files. Imported data column predictor 218 utilizes dictionary of column header names 228 to train column name-based machine learning model 220. Historical client data types 230 represent a list of a plurality of different data types captured from the plurality of previously imported clients' data files. Imported data column predictor 218 utilizes historical client data types 230 to train data type-based machine learning model 222.

Imported data file 232 represents a currently imported data file from a subscribing client. However, it should be noted that imported data file 232 may represent a plurality of different data files imported from a plurality of different subscribing clients. Imported data file 232 may include any type of data corresponding to any type of data domain associated with the client.

In this example, imported data file 232 includes client identifier 234. Client identifier 234 uniquely identifies the client entity corresponding to imported data file 232. It should be noted that the client entity is a subscribing client to the human capital management service hosted by data processing system 200. The client entity may be, for example, an enterprise, business, company, organization, institution, agency, or the like.

Imported data file 232 is comprised of columns 236. Columns 236 may include any number of columns. Columns 236 include rows 238. Rows 238 may include any number of rows. Each row of a particular column contains a data value entry corresponding to that particular column. Further, columns 236 include column header names 240. Each respective column header name of column header names 240 corresponds to a particular column in imported data file 232 and is descriptive of the type of data contained in that particular column.

Human capital management application 242 provides the human capital management services hosted by data processing system 200. It should be noted that imported data column predictor 218 may be a component of human capital management application 242 even though imported data column predictor 218 is illustrated separately in this example. Database 244 corresponds to human capital management application 242. Database 244 is comprised of columns 246. Columns 246 include column header names 248.

Human capital management application 242 utilizes imported data column predictor 218 to map column header names 248 of columns 246 in database 244 with column header names 240 of columns 236 in imported data file 232 based on the output of column name-based machine learning model 220 and data type-based machine learning model 222 after analyzing column header names 240 and column header names 248. Imported data column predictor 218 generates source column name to target column name mapping 250 based on the mapping between column header names 248 of columns 246 in database 244 and column header names 240 of columns 236 in imported data file 232.

Imported data column predictor 218 then sends source column name to target column name mapping 250 to the client entity associated with client identifier 234 for review and correction, if needed. If corrections to source column name to target column name mapping 250 are needed due to one or more inaccurate mappings, then the client entity sends client feedback 252, which contains a set of corrections for the one or more inaccurate mappings in source column name to target column name mapping 250. Imported data column predictor 218 saves client feedback 252 and utilizes client feedback to update machine learning model training data 226 for retraining column name-based machine learning model 220 and data type-based machine learning model 222 to increase their predictive accuracy for future imported client data files.

Further, imported data column predictor 218 may perform a data validation process using a set of predefined business rules to ensure data integrity prior to ingesting imported data file 232 into database 244. If no data validation errors are found during the data validation process, then imported data column predictor 218 ingests imported data file 232 into database 244 based on source column name to target column name mapping 250.

As a result, data processing system 200 operates as a special purpose computer system in which imported data column predictor 218 in data processing system 200 enables intelligent ingestion of client data. In particular, imported data column predictor 218 transforms data processing system 200 into a special purpose computer system as compared to currently available general computer systems that do not have imported data column predictor 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity, Bluetooth® technology, global system for mobile communications, code division multiple access, second-generation, third-generation, fourth-generation, fourth-generation long term evolution, long term evolution advanced, fifth-generation, or any other wireless communication technology or standard to establish a wireless communications link for data processing system 200. Bluetooth is a registered trademark of Bluetooth Sig, Inc., Kirkland, Washington.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208.

These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 254 is located in a functional form on computer readable media 256 that is selectively removable and may be loaded onto or transferred to data processing system 200 for running by processor unit 204. Program code 254 and computer readable media 256 form computer program product 258. In one example, computer readable media 256 may be computer readable storage media 260 or computer readable signal media 262.

In these illustrative examples, computer readable storage media 260 is a physical or tangible storage device used to store program code 254 rather than a medium that propagates or transmits program code 254. In other words, computer readable storage media 260 exclude a propagation medium, such as transitory signals. Computer readable storage media 260 may include, for example, an optical or magnetic disc that is inserted or placed into a drive or other device that is part of persistent storage 208 for transfer onto a storage device, such as a hard drive, that is part of persistent storage 208. Computer readable storage media 260 also may take the form of a persistent storage, such as a hard drive, a thumb drive, or a flash memory that is connected to data processing system 200.

Alternatively, program code 254 may be transferred to data processing system 200 using computer readable signal media 262. Computer readable signal media 262 may be, for example, a propagated data signal containing program code 254. For example, computer readable signal media 262 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 256" can be singular or plural. For example, program code 254 can be located in computer readable media 256 in the form of a single storage device or system. In another example, program code 254 can be located in computer readable media 256 that is distributed in multiple data processing systems. In other words, some instructions in program code 254 can be located in one data processing system while other instructions in program code 254 can be located in one or more other data processing systems. For example, a portion of program code 254 can be located in computer readable media 256 in a server computer while another portion of program code 254 can be located in computer readable media 256 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 254.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Illustrative embodiments take into account that an intuitive human capital management application can increase workforce productivity and morale. Data of an intuitive human capital management application can power better business decisions from optimized schedules to competitive compensation packages. Also, an intuitive human capital management application can enable proactive approaches to changing regulations to maintain compliance in an environment where compliance regulations in countries around the world are increasing. Thus, global and local monitoring by an intuitive human capital management application can enable businesses to stay current with changing regulations for compliance. Further, an intuitive human capital management application can increase data security and privacy using multi-layered protection and security alerts to prevent data breaches and fraud.

Client on-boarding is a challenge for both clients and human capital management service providers. For example, clients can spend a significant amount of time and effort converting data from their previous human capital management service providers to a template supported by the current human capital management service provider. In addition, the current human capital management service provider can spend a significant amount of time and effort getting that client data setup in its human capital management system. Further, when the client is a small to medium-sized business, spending too much time on setting up client data may not provide sufficient returns for the provider.

Illustrative embodiments utilize machine learning models to understand the imported client data in a file during ingestion of that imported client data. As a result, illustrative embodiments enable the client, itself, to perform the data migration process. Furthermore, illustrative embodiments ensure that data integrity is not compromised by performing data validations prior to ingesting the migrated client data into a database corresponding to the human capital management service.

In response to a client uploading a data file, illustrative embodiments map the uploaded data to appropriate data columns in the database of the human capital management service using a plurality of machine learning models. Illustrative embodiments train one of the machine learning models using a dictionary of data column header names. Illustrative embodiments utilize this column header name-based machine learning model to predict the appropriate column header name in the database of the human capital management service that matches a given column header name in the client's data file. For example, illustrative embodiments may utilize the column header name-based machine learning model to predict a data column header name when a prediction may be difficult (e.g., when selecting between first name, last name, nickname, or the like).

Illustrative embodiments train another of the machine learning models using stored historical client data types (e.g., business names, email addresses, mailing addresses, postal or zip codes, phone numbers, and the like). Illustrative embodiments utilize this data type-based machine learning model to identify the type of data in a given data column of the client's data file. For example, illustrative embodiments may utilize the data type-based machine learning model to predict a data column header name when the client data has a pattern associated with it or has a constant or finite value associated with it (e.g., a business name, email address, mailing address, zip code, phone number, or the like). Illustrative embodiments may select a configurable number of rows (e.g., 10, 20, 30, or the like) from that particular column of the client's data file to analyze to identify the data type rather than analyzing all rows of that column in order to save computer resources and time.

Optionally, illustrative embodiments may utilize a column proximity-based machine learning model to predict a data column header name when, for example, a column does not include a header name. Illustrative embodiments may utilize this column proximity-based machine learning model to predict a data column header name related to a column that contains date values, Boolean values, or the like. The column proximity-based machine learning model works similar to how a human would predict a name of a particular column containing these types of values by examining other columns immediately adjacent to that particular column. For example, the column proximity-based machine learning model may analyze a configurable number of columns (e.g., their header names and corresponding data values) immediately adjacent to either side or both sides of a particular column not including a header name. The configurable number of columns may be, for example, one, two, three, or the like.

It should be noted that illustrative embodiments utilize supervised machine learning to train the machine learning models in these examples. However, alternative illustrative embodiments may utilize other types of machine learning algorithms, such as, for example, a semi-supervised or unsupervised machine learning algorithm, to train the machine learning models. Also, illustrative embodiment can continuously retrain the machine learning models using received and stored client feedback regarding data column mappings to update the training datasets of the machine learning models. By utilizing these trained machine learning models, illustrative embodiments increase the predictive accuracy of the computer and thereby increase performance of the computer, itself.

If the output of both the column name-based machine learning model and the data type-based machine learning model is the same for a particular data column of the client's data file (e.g., both models map to the same predicted corresponding data column in the database corresponding to the human capital management service), then illustrative embodiments determine that no conflict exists and utilize the predicted data column in the database corresponding to the human capital management service as the target data column for that particular data column of the client's data file. If the output of the column name-based machine learning model and the output of the data type-based machine learning model are different for a particular data column of the client's data file (e.g., both models map to different predicted data columns in the database corresponding to the human capital management service), then illustrative embodiments determine that a conflict exists and generate a decision tree to determine which machine learning model output is best to utilize for that particular data column of the client's data file. Illustrative embodiments generate the decision tree utilizing a supervised machine learning algorithm. Illustrative embodiments also generate an accuracy level (e.g., high, medium, or low) for the mapping output of each respective machine learning model corresponding to each respective data column of the client's data file.

Illustrative embodiments send the column mapping output of each respective machine learning model corresponding to each respective data column of the client's data file, along with the corresponding accuracy level of that particular column mapping, to the client for review prior to ingesting the client's data into the database corresponding to the human capital management service (e.g., a database corresponding to that particular client). Subsequently, illustrative embodiments receive an indication from the client as to whether changes to the current column mappings are needed or not. If the client indicates that no changes to the current column mappings are needed, then illustrative embodiments perform a data validation process on the client's data to ensure data integrity using a set of predefined business rules. If illustrative embodiments find one or more data validation errors during the data validation process, then illustrative embodiments send the data validation errors to the client for correction and rerun the data validation process upon receiving the corrections to the errors from the client. If illustrative embodiments do not find any data validation errors indicating no compromise to the data integrity while performing the data validation process, then illustrative embodiments ingest the client's data using the current column mappings predicted by the machine learning models.

If the client indicates that changes are needed to the current column mappings because one or more column header names are not mapped correctly, then illustrative embodiments wait to receive the changes to the current column mappings from the client prior to performing the validation process on the client's data. In response to receiving a set of modifications to the current column mappings from the client, illustrative embodiments store the client-modified column mappings for future machine learning model retraining to increase predictive accuracy of the machine learning models and perform the data validation process. In response to illustrative embodiments finding no data validation errors during the data validation process, illustrative embodiments ingest the client's data using the client-modified column mappings.

As a result, illustrative embodiments provide a data migration and ingestion process that enables a subscribing client to upload data files (e.g., human capital management reports) from previous service providers, irrespective of who the previous service providers are. Illustrative embodiments intelligently understand and ingest the uploaded data files from the subscribing client.

Thus, illustrative embodiments provide one or more technical solutions that overcome a technical problem with maintaining data integrity during data migration from data source to data target. As a result, these one or more technical solutions provide a technical effect and practical application in the field of data migration.

With reference now to FIGS. 3A-3C, a flowchart illustrating a process for intelligently ingesting client data is shown in accordance with an illustrative embodiment. The process shown in FIGS. 3A-3C may be implemented in a computer, such as, for example, server 104 in FIG. 1 or data processing system 200 in FIG. 2. For example, the process can be implemented in imported data column predictor 218 in FIG. 2.

The process begins when the computer receives an imported data file corresponding to a subscribing client via a network (step 302). The imported data file is comprised of a plurality of columns and a plurality of rows, such as, for example, in a relational database, table, rectangular dataset, or the like. The computer analyzes the imported data file corresponding to the subscribing client to determine a column header name of each respective column of the plurality of columns (step 304). The computer may utilize, for example, natural language processing, parsing, or the like, to analyze the imported data file to determine the column header names.

Subsequently, the computer selects a column from the plurality of columns in the imported data file (step 306). The computer maps a determined column header name of the selected column in the imported data file to a predicted corresponding column header name of a particular column in a database corresponding to a human capital management application using a plurality of machine learning models (step 308). The plurality of machine learning models may include, for example, a column name-based machine learning model, a data type-based machine learning model, and optionally a column proximity-based machine learning model.

Afterward, the computer makes a determination as to whether the predicted corresponding column header name output by each respective machine learning model of the plurality of machine learning models matches (step 310). If the computer determines that the predicted corresponding column header name output by each respective machine learning model of the plurality of machine learning models does match, yes output of step 310, then the process proceeds to step 316. If the computer determines that the predicted corresponding column header name output by each respective machine learning model of the plurality of machine learning models does not match, no output of step 310, then the computer generates a decision tree to determine which particular machine learning model of the plurality of machine learning models is best for predicting a corresponding column header name in the database corresponding to the human capital management application for the determined column header name of the selected column in the imported data file (step 312). The computer may utilize, for example, a decision tree algorithm to generate the decision tree. The decision tree algorithm is a supervised machine learning algorithm that continuously divides data based on a predefined set of rules until a final outcome is generated.

The computer identifies the predicted corresponding column header name output by the particular machine learning model of the plurality of machine learning models that is best for predicting the corresponding column header name in the database for the determined column header name of the selected column in the imported data file using the decision tree (step 314). The computer utilizes the predicted corresponding column header name of the particular column in the database as a target column name for the determined column header name of the selected column in the imported data file (step 316). The computer also makes a determination as to whether another column exists in the plurality of columns in the imported data file (step 318).

If the computer determines that another column does exist in the plurality of columns in the imported data file, yes output of step 318, then the process returns to step 306 where the computer selects another column in the imported data file. If the computer determines that another column does not exist in the plurality of columns in the imported data file, no output of step 318, then the computer generates an accuracy level for respective predicted corresponding column header names mapped by one or more of the plurality of machine learning models to respective determined column header names of the plurality of columns in the imported data file (step 320). In addition, the computer sends a source column name to target column name mapping with corresponding accuracy levels for the respective predicted corresponding column header names mapped to the respective determined column header names of the plurality of columns in the imported data file to the subscribing client via the network (step 322).

The computer makes a determination as to whether an indication was received from the subscribing client that a set of changes to the source column name to target column name mapping is needed due to one or more inaccurate source to target column name mappings (step 324). The computer may wait for a configurable amount of time to receive the indication from the subscribing client prior to proceeding to the next step. If the computer determines that an indication was received from the subscribing client that a set of changes to the source column name to target column name mapping is needed, yes output of step 324, then the computer receives the set of changes to the source column name to target column name mapping from the subscribing client via the network (step 326). Further, the computer saves the set of changes to the source column name to target column name mapping for machine learning model retraining (step 328). For example, the computer adds the set of changes to the source column name to target column name mapping to update machine learning model training data. Subsequently, the computer utilizes the updated machine learning model training data to retrain the plurality of machine learning models. Thereafter, the process proceeds to step 330.

Returning again to step 324, if the computer determines that an indication was not received from the subscribing client that a set of changes to the source column name to target column name mapping is needed, no output of step 324, then the computer performs a data validation process on the imported data file to ensure data integrity using a set of predefined business rules (step 330). The computer makes a determination as to whether a set of data validation errors was discovered while performing the data validation process (step 332).

If the computer determines that a set of data validation errors was not discovered while performing the data validation process, no output of step 332, then the computer ingests the imported data file into the database corresponding to the human capital management application using the source column name to target column name mapping (step 334). Thereafter, the process terminates. If the computer determines that a set of data validation errors was discovered while performing the data validation process, yes output of step 332, then the computer sends the set of data validation errors to the subscribing client for corrections (step 336). Subsequently, the computer receives the corrections to the set of data validation errors from the subscribing client (step 338). The computer incorporates the corrections to the set of data validation errors into the imported data file. Thereafter, the process returns to step 330 where the computer performs the data validation process on the imported data file once again.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Thus, illustrative embodiments of the present invention provide a computer-implemented method, computer system, and computer program product for intelligently ingesting client data into a human capital management database. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for intelligent data ingestion, the computer-implemented method comprising:
    receiving, by one or more processing circuits, via a network, a data file that includes a first plurality of columns;
    identifying, by the one or more processing circuits, for each column of the first plurality of columns, a respective column name of a first plurality of column names;

executing, by the one or more processing circuits, at least one first machine learning model, using (i) a first column name of the first plurality of column names and (ii) a second plurality of column names for a second plurality of columns included in a database, to generate a first output of a first mapping for the first column name;

executing, by the one or more processing circuits, at least one second machine learning model, using one or more contents of a first column of the first plurality of columns associated with the first column name, to generate a second output of a second mapping for the first column name;

determining, by the one or more processing circuits, that the first mapping and the second mapping both map the first column name to a particular column name of the second plurality of column names, the particular column name associated with a particular column of the second plurality of columns included in the database;

mapping, by the one or more processing circuits, responsive to determining that the first mapping and the second mapping both map the first column name to the particular column name, the first column name to the particular column name; and utilizing, by the one or more processing circuits, the particular column name of the particular column to ingest the one or more contents of the first column into the database based at least on mapping the first column name to the particular column name.

2. The computer-implemented method of claim 1, further comprising:

executing, by the one or more processing circuits, the at least one first machine learning model, using (i) a second column name of the first plurality of column names and (ii) the second plurality of column names, to generate a third output of a third mapping for the second column name;

executing, by the one or more processing circuits, the at least one second machine learning model, using one or more second contents of a second column of the first plurality of columns associated with the second column name, to generate a fourth output of a fourth mapping for the second column name;

responsive to determining that the third mapping and the fourth mapping indicate different column names of the second plurality of column names, generating, by the one or more processing circuits, a decision tree to output a selection of the third mapping or the fourth mapping; and identifying, by the one or more processing circuits, a second particular column name of the second plurality of column names to map the second column name to using the selection of the decision tree.

3. The computer-implemented method of claim 1, further comprising:

generating, by the one or more processing circuits, a first accuracy level for the first output and a second accuracy level for the second output.

4. The computer-implemented method of claim 1, further comprising:

sending, by the one or more processing circuits, at least one of the first mapping or the second mapping to a client via the network.

5. The computer-implemented method of claim 4, further comprising:

determining, by the one or more processing circuits, that an indication was received from the client which indicates a set of changes to the first mapping or the second mapping;

responsive to determining that the indication was received from the client, receiving, by the one or more processing circuits, the set of changes to the first mapping or the second mapping; and saving, by the one or more processing circuits, the set of changes for retraining of the at least one first machine learning model or the at least one second machine learning model.

6. The computer-implemented method of claim 1, further comprising:

responsive to utilizing the particular column name, performing, by the one or more processing circuits, a data validation process on the data file to ensure data integrity using a set of rules.

7. The computer-implemented method of claim 6, further comprising:

determining, by the one or more processing circuits, that a set of data validation errors were not discovered while performing the data validation process; and responsive to determining that the set of data validation errors were not discovered while performing the data validation process, ingesting, by the one or more processing circuits, the one or more contents of the first column into the database.

8. The computer-implemented method of claim 6, further comprising:

responsive to determining that a set of data validation errors were discovered while performing the data validation process, sending, by the one or more processing circuits, the set of data validation errors to a client for correction;

receiving, by the one or more processing circuits, one or more corrections to the set of data validation errors from the client; and performing, by the one or more processing circuits, the data validation process on the data file with the one or more corrections incorporated.

9. The computer-implemented method of claim 1, wherein the at least one first machine learning model includes a column name-based machine learning model, and wherein the at least one second machine learning model includes a data type-based machine learning model.

10. The computer-implemented method of claim 9, wherein the one or more processing circuits are configured to train the column name-based machine learning model using a dictionary of column header names and train the data type-based machine learning model using historical client data types.

11. A computer system for intelligent data ingestion, the computer system comprising:

a bus system;

a storage device connected to the bus system, wherein the storage device stores program instructions; and a processor connected to the bus system, wherein the processor executes the program instructions to:

receive, via a network, a data file that includes a first plurality of columns;

identify, for each column of the first plurality of columns, a respective column name of a first plurality of column names;

execute at least one first machine learning model, using (i) a first column name of the first plurality of column names and (ii) a second plurality of column names for a second plurality of columns included in a database, to generate a first output of a first mapping for the first column name;

execute at least one second machine learning model, using one or more contents of a first column of the first plurality of columns associated with the first column name, to generate a second output of a second mapping for the first column name;

determine that the first mapping and the second mapping both map the first column name to a particular column name of the second plurality of column names, the particular column name associated with a particular column of the second plurality of columns included in the database;

map, responsive to determination that the first mapping and the second mapping both map the first column name to the particular column name, the first column name to the particular column name; and utilize the particular column name of the particular column to ingest the one or more contents of the first column into the database based at least on the first column name having been mapped to the particular column name.

12. The computer system of claim 11, wherein the processor further executes the program instructions to:

execute the at least one first machine learning model, using (i) a second column name of the first plurality of column names and (ii) the second plurality of column names, to generate a third output of a third mapping for the second column name;

execute the at least one second machine learning model, using one or more second contents of a second column of the first plurality of columns associated with the second column name, to generate a fourth output of a fourth mapping for the second column name;

responsive to determination that the third mapping and the fourth mapping indicate different column names of the second plurality of column names, generate a decision tree to output a selection of the third mapping or the fourth mapping; and identify a second particular column name of the second plurality of column names to map the second column name to using the selection of the decision tree.

13. The computer system of claim 11, wherein the processor further executes the program instructions to:

generate a first accuracy level for the first output and a second accuracy level for the second output.

14. The computer system of claim 11, wherein the processor further executes the program instructions to:

send at least one of the first mapping or the second mapping to a client via the network.

15. The computer system of claim 14, wherein the processor further executes the program instructions to:

determine that an indication was received from the client which indicates a set of changes to the first mapping or the second mapping;

receive the set of changes to the first mapping or the second mapping; and save the set of changes for retraining of the at least one first machine learning model or the at least one second machine learning model.

16. The computer system of claim 11, wherein the processor further executes the program instructions to:

perform, responsive to utilization of the particular column name, a data validation process on the data file to ensure data integrity using a set of rules.

17. The computer system of claim 16, wherein the processor further executes the program instructions to:

determine that a set of data validation errors were not discovered while performing the data validation process; and ingest the one or more contents of the first column into the database.

18. The computer system of claim 16, wherein the processor further executes the program instructions to:

responsive to determination that a set of data validation errors were discovered while performing the data validation process, send the set of data validation errors to a client for correction;

receive one or more corrections to the set of data validation errors from the client; and perform the data validation process on the data file with the one or more corrections incorporated.

19. A computer program product for intelligent data ingestion, the computer program product comprising one or more non-transitory computer readable storage medium having program instructions embodied therewith, the program instructions executable by one or more processors to cause the one or more processors to perform operations comprising:

receiving, via a network, a data file that includes a first plurality of columns;

identifying, for each column of the first plurality of columns, a respective column name of a first plurality of column names;

executing at least one first machine learning model, using (i) a first column name of the first plurality of column names and (ii) a second plurality of column names for a second plurality of columns included in a database, to generate a first output of a first mapping for the first column name;

executing at least one second machine learning model, using one or more contents of a first column of the first plurality of columns associated with the first column name, to generate a second output of a second mapping for the first column name;

determining that the first mapping and the second mapping both map the first column name to a particular column name of the second plurality of column names, the particular column name associated with a particular column of the second plurality of columns in the database;

mapping, responsive to determining that the first mapping and the second mapping both map the first column name to the particular column name, the first column name to the particular column name; and utilizing the particular column name of the particular column to ingest the one or more contents of the first column into the database based at least on the first column name having been mapped to the particular column.

20. The computer program product of claim 19, wherein the operations further comprise:

executing the at least one first machine learning model, using (i) a second column name of the first plurality of column names and (ii) the second plurality of column names, to generate a third output of a third mapping for the second column name;

executing the at least one second machine learning model, using one or more second contents of a second column of the first plurality of columns associated with the second column name, to generate a fourth output of a fourth mapping for the second column name;

responsive to determining that the third mapping and the fourth mapping indicate different column names of the second plurality of column names, generating a decision tree to output a selection of the third mapping or the fourth mapping; and identifying a second particular column name of the second plurality of column names to map the second column name to using the selection of the decision tree.

21. The computer program product of claim 19, wherein the operations further comprise:

generating a first accuracy level for the first output and a second accuracy level for the second output.

22. The computer program product of claim 19, wherein the operations further comprise:

sending at least one of the first mapping or the second mapping to a client via the network.

23. The computer program product of claim 22, wherein the operations further comprise:

determining that an indication was received from the client which indicates a set of changes to the first mapping or the second mapping;

responsive determining that the indication was received from the client, receiving the set of changes to the first mapping or the second mapping; and saving the set of changes for retraining of the at least one first machine learning model or the at least one second machine learning model.

24. The computer program product of claim 19, wherein the operations further comprise:

responsive to utilizing the particular column name, performing a data validation process on the data file to ensure data integrity using a set of rules.

25. The computer program product of claim 24, wherein the operations further comprise:

determining that a set of data validation errors were not discovered while performing the data validation process; and responsive to determining that the set of data validation errors were not discovered while performing the data validation process, ingesting the one or more contents of the first column into the database.

26. The computer program product of claim 24, wherein the operations further comprise:

responsive to determining that a set of data validation errors were discovered while performing the data validation process, sending the set of data validation errors to a client for correction;

receiving the one or more corrections to the set of data validation errors from the client; and performing the data validation process on the imported data file with the one or more corrections incorporated.

27. A method for intelligent data ingestion, the method comprising:

determining, by one or more processing circuits, that a first mapping and a second mapping of one or more machine learning models both map a first column name of a data file with a particular column name of a database;

mapping, by the one or more processing circuits, responsive to determining that the first mapping and the second mapping both map the first column name to the particular column name, the first column name to the particular column name; and utilizing, by the one or more processing circuits, the particular column name to ingest one or more contents of a column associated with the first column name into the database.

* * * * *